US008095950B1

(12) United States Patent
Lapcevic

(10) Patent No.: US 8,095,950 B1
(45) Date of Patent: Jan. 10, 2012

(54) SYSTEM AND METHOD FOR DELIVERING AUDIO AND VIDEO CONTENT TO REMOTE FACILITIES BASED UPON INPUT ADVERTISING CONTENT SELECTIONS

(75) Inventor: Thomas Lapcevic, Pittsburgh, PA (US)

(73) Assignee: Clubcom, LLC, Pittsburgh, PA (US)

( * ) Notice: Subject to any disclaimer, the term of this patent is extended or adjusted under 35 U.S.C. 154(b) by 1343 days.

(21) Appl. No.: 10/627,574

(22) Filed: Jul. 24, 2003

Related U.S. Application Data

(63) Continuation of application No. 09/532,163, filed on Mar. 21, 2000, now abandoned.

(51) Int. Cl.
*H04N 7/10* (2006.01)
*H04N 7/16* (2011.01)
*H04N 7/18* (2006.01)
*H04N 7/173* (2011.01)
*G06Q 30/00* (2006.01)
*G06F 15/16* (2006.01)
*G06F 15/173* (2006.01)

(52) U.S. Cl. ............... 725/36; 725/28; 725/74; 725/80; 725/86; 705/14.4; 705/14.49; 705/14.53; 705/14.55; 705/14.6; 705/14.66; 705/14.67; 705/14.72; 705/14.73; 709/203; 709/217; 709/223

(58) Field of Classification Search .................. 725/36, 725/28, 74, 80, 82, 85, 86; 705/14.4, 14.43, 705/14.47, 14.49, 14.53, 14.55, 14.6, 14.66, 705/14.67, 14.72, 14.73; 709/203, 217, 223
See application file for complete search history.

(56) References Cited

U.S. PATENT DOCUMENTS

| | | | |
|---|---|---|---|
| 4,647,974 A | 3/1987 | Butler et al. | |
| 4,829,372 A | 5/1989 | McCalley et al. | |
| 4,920,432 A | 4/1990 | Eggers et al. | |
| 5,207,621 A | 5/1993 | Koch et al. | |
| 5,440,334 A | 8/1995 | Walters et al. | |
| 5,644,714 A | 7/1997 | Kikinis | |
| 5,717,923 A | 2/1998 | Dedrick | |
| 5,721,827 A * | 2/1998 | Logan et al. | 709/217 |
| 5,724,521 A | 3/1998 | Dedrick | |
| 5,740,549 A | 4/1998 | Reilly et al. | |
| 5,841,979 A | 11/1998 | Schulhof et al. | |
| 5,848,398 A * | 12/1998 | Martin et al. | 705/14 |
| 5,860,068 A | 1/1999 | Cook | |
| 5,887,133 A | 3/1999 | Brown et al. | |
| 5,940,397 A | 8/1999 | Humpleman | |
| 5,995,943 A | 11/1999 | Bull et al. | |
| 6,006,257 A | 12/1999 | Slezak | |
| 6,029,045 A | 2/2000 | Picco et al. | |
| 6,064,979 A * | 5/2000 | Perkowski | 705/26 |
| 6,122,658 A | 9/2000 | Chaddha | |
| 6,226,672 B1 * | 5/2001 | DeMartin et al. | 709/219 |
| 6,345,293 B1 * | 2/2002 | Chaddha | 709/219 |

(Continued)

*Primary Examiner* — Hoang-Vu A Nguyen-Ba
(74) *Attorney, Agent, or Firm* — Mark S. Leonardo; Liilian R. Horowitz; Brown Rudnick LLP

(57) ABSTRACT

A computer-assisted method of preparing video and audio content for playback at a plurality of facilities. The method includes transferring the content from a central network computer to at least one remote playback system located in each of the facilities. The method also includes generating, using the central network computer, at least one playlist for each of the facilities, the playlist for determining an order of playback of the content and transferring each of the playlists from the central network computer to the playback system in each of the facilities.

18 Claims, 13 Drawing Sheets

U.S. PATENT DOCUMENTS

| | | |
|---|---|---|
| 6,385,592 B1 * | 5/2002 | Angles et al. ............. 705/14 |
| 6,393,430 B1 | 5/2002 | Van Ryzin |
| 6,456,981 B1 | 9/2002 | Dejaeger et al. |
| 6,463,587 B1 | 10/2002 | Takahashi et al. |
| 6,496,980 B1 | 12/2002 | Tillman et al. |
| 6,553,404 B2 | 4/2003 | Stern |
| 6,588,013 B1 | 7/2003 | Lumley et al. |
| 6,697,944 B1 * | 2/2004 | Jones et al. ............. 713/168 |
| 6,763,334 B1 * | 7/2004 | Matsumoto et al. ......... 705/14 |
| 6,931,591 B1 * | 8/2005 | Brown et al. ............ 715/205 |
| 7,146,627 B1 * | 12/2006 | Ismail et al. ............. 725/47 |
| 2002/0166120 A1 | 11/2002 | Boylan et al. |

* cited by examiner

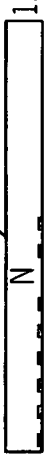
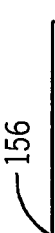

FIG. 9  1. MANDATED SELECTIONS(N) –FILE AND TIME

FIG. 10  2. ADS(A) AND INTERSTITIALS(I) INSERTED (ACTIVATED FILES RANDOMLY DISTRIBUTED WITH GIVEN RULES)

FIG. 11  3. ENTERTAINMENT INSERTS–HIGH(H), MODERATE(M), AND LOW(L) RANDOM INSERTION OF ENTERTAINMENT USING 1–20 SCALE OF RELATIVE TEMPOS

| HIGH ENT.(H) | MOD. ENT.(M) | LOW ENT.(L) | ADS(A) | INTERSTITIALS(I) |
|---|---|---|---|---|
| HE0001 | ME0001 | LE0001 | AD0001 | INT0001 |
| HE0002 | ME0002 | LE0002 | AD0002 | INT0002 |
| HE0003 | ME0003 | LE0003 | AD0003 | INT0003 |
| HE0004 | ME0004 | LE0004 | AD0004 | INT0004 |
| HE0005 | ME0005 | LE0005 | AD0005 | INT0005 |
| HE0006 | ME0006 | LE0006 | AD0006 | INT0006 |
| HE0007 | ME0007 | LE0007 | AD0007 | INT0007 |
| HE0008 | ME0008 | LE0008 | AD0008 | INT0008 |
| HE0009 | ME0009 | LE0009 | AD0009 | INT0009 |
| HE0010 | ME0010 | LE0010 | AD0010 | INT0010 |
| HE0011 | ME0011 | LE0011 | AD0011 | INT0011 |

FIG. 12

SYSTEM AND METHOD FOR DELIVERING AUDIO AND VIDEO CONTENT TO REMOTE FACILITIES BASED UPON INPUT ADVERTISING CONTENT SELECTIONS

CROSS-REFERENCE TO RELATED APPLICATIONS

This application is a continuation of application Ser. No. 09/532,163 filed on Mar. 21, 2000 now abandoned.

STATEMENT REGARDING FEDERALLY SPONSORED RESEARCH (Not applicable)

BACKGROUND OF THE INVENTION

1. Field of the Invention

The present invention is directed generally to a system and method for delivering audio and video programming content to a remote location.

2. Description of the Background

In facilities such as, for example, health clubs, restaurants, waiting rooms, retail stores, and other public and private environments, it is often desirable to deliver entertainment and advertisements to the patrons of the facility during a visit. For example, many health clubs have television monitors and speaker systems positioned throughout the facility to broadcast network, or cable television signals and music from a radio signal or from a pre-recorded source such as from a compact disc player.

Systems currently exist which deliver entertainment to facilities such as waiting rooms and elevators. For example, the network news channel CNN is broadcast on television monitors in airport waiting rooms and in hotel elevators. Such systems do not deliver customized content, but rather deliver a common broadcast signal. There also exists systems in which a video server is placed at a location so that video and audio content may be played back through television monitors. Such servers typically have software which determines, with manual intervention, a playlist of the content. For example, the servers could generate a playlist randomly based on the content stored on the server. When such servers are inexpensive servers, they generally cannot reliably perform the task of playing content because they do not have the processing power to generate a playlist and play the content. More expensive and powerful servers may be used, but the relative cost of such servers generally outweighs the utility of delivering content. Furthermore, such systems do not generally allow for the customization of the content stored on the servers.

There also exist methods for syndicating advertisements. For example, television advertisements are often produced for affiliated entities (e.g. entities selling the same products or services) and distributed to multiple regions of the United States. Local advertisers add customized identifiers and/or voice-overs to the advertisements and, thus, the same commercial is used in multiple regions. For example, a car manufacturer may produce an advertisement that depicts a certain car model. The advertisement is then distributed to multiple geographic regions where taglines for local car dealers are added to the advertisement. Likewise, radio advertisements are often produced and distributed to multiple regions of the United States. Local advertisers add customized audio and broadcast the advertisements locally. Such schemes do not allow for advertisers to target specific facilities or households with customized advertisements. Furthermore, such schemes do not allow for targeting of specific advertising categories using multiple advertisements having common theme-specific content and customized advertiser identifiers. Also, such schemes do not allow for delivering the advertisements via a computer network to targeted facilities. Also, such schemes are not suited to deliver advertisements for use by entities that are not affiliated with other entities or advertisers that use the same advertisements.

Thus, there is a need for a system and method of delivering entertainment and advertising content to facilities which use relatively inexpensive playback systems that may be programmed from a remote location to play back the content in a desired order. Furthermore, there is a need for a system and method of delivering content to facilities which allow for the customization of all or a portion of the content.

SUMMARY OF THE INVENTION

The present invention is directed to a computer-assisted method of preparing video and audio content for playback at a plurality of facilities. The method includes transferring the content from a central network computer to at least one remote playback system located in each of the facilities. The method also includes generating, using the central network computer, at least one playlist for each of the facilities, the playlist for determining an order of playback of the content and transferring each of the playlists from the central network computer to the playback system in each of the facilities.

The present invention represents a substantial advance over prior systems and methods of delivering entertainment and advertising content to facilities. The present invention has the advantage that it utilizes relatively inexpensive playback systems that may be programmed from a remote location to play back the content in a desired order. The present invention also has the advantage that it allows for the customization of all or a portion of the content.

BRIEF DESCRIPTION OF THE DRAWINGS

For the present invention to be clearly understood and readily practiced, the present invention will be described in conjunction with the following figures, wherein;

FIGS. 9-11 are diagrams illustrating an example of a portion of a playlist during generation;

FIG. 12 is a diagram illustrating an example of a library from which content is retrieved after the playlist is generated;

DETAILED DESCRIPTION OF THE PREFERRED EMBODIMENT

Figure 1:
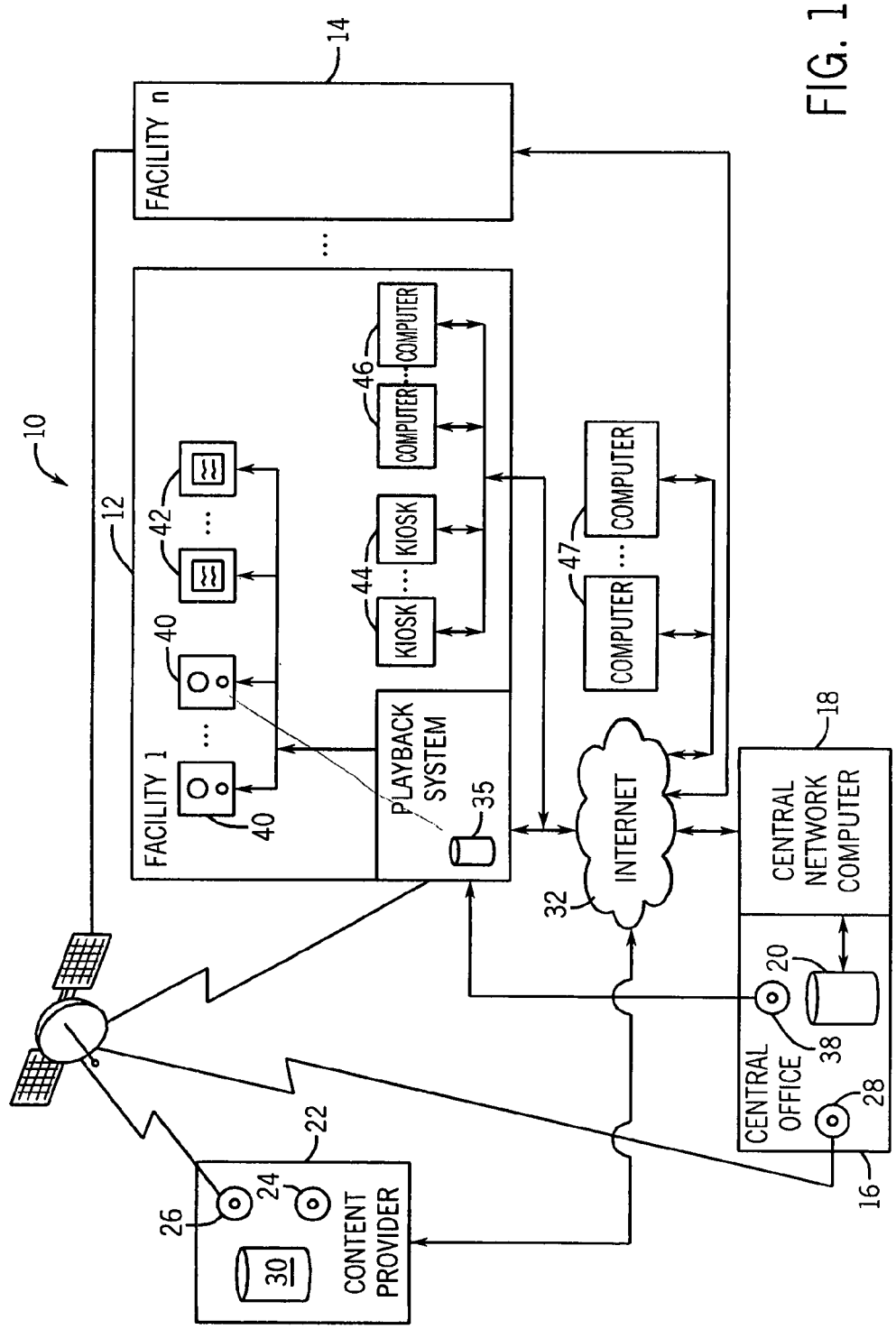
FIG. 1 is a diagram illustrating a video and audio content system according to an embodiment of the present invention.

FIG. 1 is a diagram illustrating a video and audio content system 10 according to an embodiment of the present invention. The system 10 is configured for transferring and displaying is video and audio content at a number of facilities, denoted as 12 and 14 in FIG. 1. The facilities 12 and 14 are merely illustrative of the number of facilities that may be served by the system 10. Such a number could range from one facility to many hundreds or thousands of facilities. The video and audio content can be any type of content such as, for example, music videos, movie trailers, movies, local, regional, or national advertisements, infomercials, and content customized for a particular facility such as, for example, customized advertisements. The video and audio content may be in a digital format which may be in a compressed format such as, for example, the MPEG format (and all such later versions of the format—e.g. MPEG-2, etc.), the JPEG format, the gif format, and the way format.

A central office 16 manages the delivery of video and audio content to the facilities 12, 14. The central office 16 includes a central network computer 18. The central office 16 allows for a concentration of technical staff and a centralized location for storage and management of content. The computer 18 can be any type of computer suitable such as, for example, a workstation or a personal computer, and can have any type of operating system suitable such as, for example, MICROSOFT WINDOWS NT platform. The computer 18 is in communication with a content database 20. The content database 20 can be any type of database suitable for storing audio and video content such that a large library of content may be accessed, updated and added to by content management personnel in the central office 16. The database 20 may reside on the computer 18 or may be separate from the computer 18.

The content resident in the database 20 can be obtained from a content provider source (or multiple sources) 22. The content provider source can be, for example, a distributor of music videos. The content resident in the database 20 may also be video/audio content that is produced specifically for one or multiple facilities 12, 14. The content may be in the form of, for example, swappable hard drives, compact discs (CDs) or digital video discs (DVDs) 24, or may be downloaded, via satellite links 26 and 28, or a direct telephone link (not shown) from a database 30 in the content provider source 22 to the central network computer 18. The content may also be obtained by way of a transfer from the database 30 to the central network computer 18 via the Internet 32. An efficient way of downloading the content is to transfer common content, i.e. content that will be transferred to multiple facilities 12, 14, via the satellite links 26, 28, while transferring customized content, i.e. content that is customized for one or a small number of the facilities 12, 14, via the Internet 32.

The central office 16 can transfer, via the computer 18, content to playback systems 34 in the facilities 12, 14 via, for example, the Internet 32, satellite links 28, 36, or by physical installation of hard drive, CDs or DVDs 38 on the playback system 34. The system 34 may include, for example, video/audio server software such as, for example, those sold by DCI ENTERTAINMENT under the DATABEAT name. The server software of the system 34 may be resident on, for example, a personal computer or a workstation which has a storage medium 35 such as, for example, a magnetic memory or an array of compact disc devices. The content can be played on audio speakers 40 via amplifiers (not shown) and video monitors 42 located throughout the facilities 12, 14. Kiosks 44 and user computers 46 may be located throughout the facilities 12, 14 to allow employees and patrons of the facilities 12, 14 to access the central network computer 18 via the Internet 32 as described herein below. The kiosks 44 may be configured to access the computer 18 and/or the World Wide Web portion of the Internet 32 so that users of the kiosks may interact with the central office 16 and may browse certain web sites for which the kiosks 44 are configured to permit access to by users of the kiosks 44 patrons and employees of the facilities 12, 14 may be given user names and passwords in order to access the central network computer 18. The central network computer 18 may also be accessed by user computers 47 which may be located outside the facilities 12, 14 in, for example, households or businesses. The computers 47 may access the central office 16 via, for example, the Internet 32. The computers 46, 47 may be any type of computer suitable to access the Internet 32. The kiosks 44 and the computers 46, 47 may be computers which are integral to a function, or a theme, of a facility. For example, the kiosks 44 and the computers 46, 47 may be computers integrated with exercise machines if the facility 12, 14 is a health club or a person's private residence.

Figure 2:
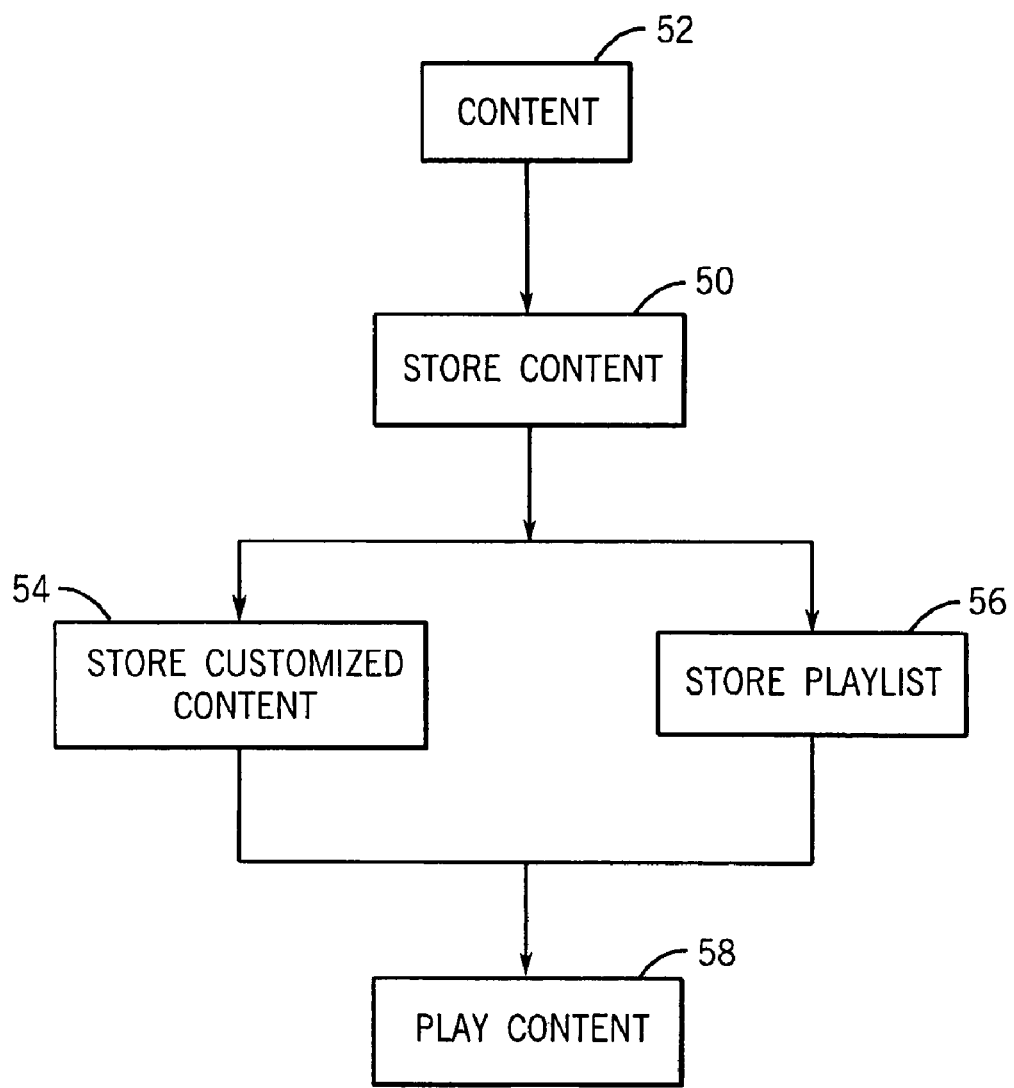
FIG. 2 is a diagram illustrating an embodiment of a flow through the system of FIG. 1.

FIG. 2 is a diagram illustrating an embodiment of a flow through the system 10 of FIG. 1. At step 50, audio and video content 52 is stored on the playback system 34 at one or many of the facilities 12, 14. The content 52 is obtained either from the central office 16 or directly from the content provider 22. At step 54, the central office 16 stores customized audio and video content on the playback system 34. At step 56, the central office stores a playlist on the playback system 34. At step 58, the content is played by the playback system 34 at the facility 12, 14 in which the server 34 is located.

Figure 3:
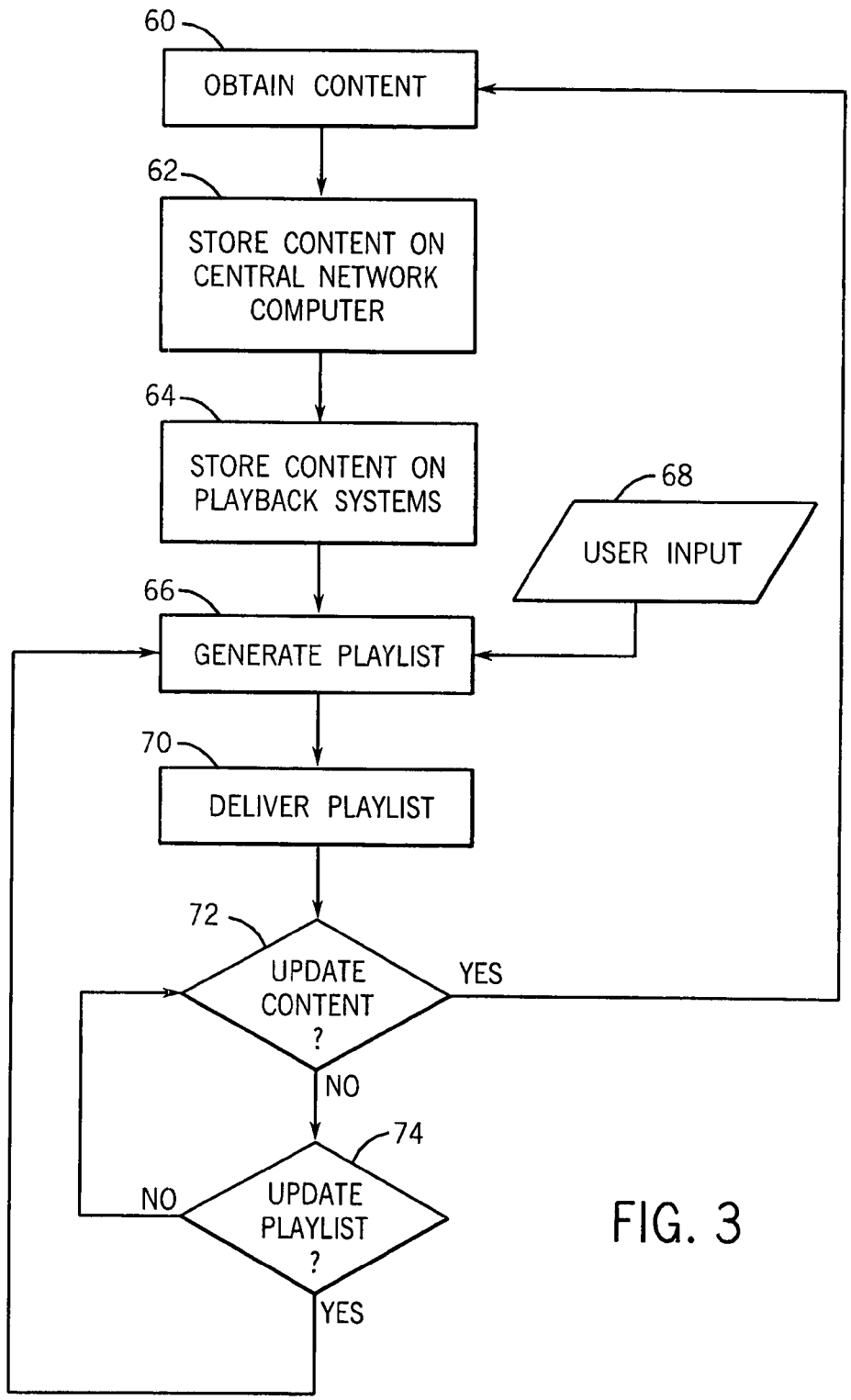
FIG. 3 is a diagram illustrating an embodiment of a flow through the system of FIG. 1 when the system transfers video and audio content and playlists to the playback system of FIG. 1.

FIG. 3 is a diagram illustrating an embodiment of a flow through the system 10 of FIG. 1 when the system 10 transfers video and audio content and playlists to the playback system 34 at one of the facilities 12, 14. At step 60, the central office 16 obtains the audio and video content 52 from the content provider 22. The content is stored in the database 20 at the central office 16 at step 62. At step 64, the content 52 is transferred from the central office 16 via, for example, the Internet 32, to the playback system 34 at the facility 12, 14. Alternatively, the content 52 may be transferred directly from the content provider 22 to the playback system 34. The content 52 is transferred with corresponding indices for each portion of the content such that the computer 18 can reference each portion of the content (e.g. a video clip) when directing the server 34 to play, via a playlist, certain portions of the content at certain times of the day and days of the week. For example, a portion of the content could be assigned an index code of M13SAV01SG based on input to the computer 18 by personnel who are familiar with the content in the database 20. The "M" indicates that the clip is a music video, the "1" indicates that the clip is a pop song, the "3" indicates that the clip is a pop ballad, the "SAV" indicates the artist performing in the clip, the "01" indicates the song for that particular artist, the "S" indicates that the song is a slow tempo song, and the "G" indicates that the content rating is a general rating. The content portions can Busbee referenced in a playlist using many index criteria or combination of criteria. Also, portions of the content may be waited for each playback time slot based on certain or all of the index criteria so that the playlist may be generated based on such weights. For example, a music video with a restrictive rating may have a low weight assigned to it for playback from 5 a.m. to 9 p.m. and may have a higher weight assigned to it for playback after 9 p.m. also, content with a restrictive rating may never be played during a time period which is slotted for content with a general rating. Such content with a restrictive rating would be assigned a weight of "0" for the general rating time period. Portions of the content may also be waited based on its popularity based on feedback from patrons and employees of the facilities 12, 14, based on central office 16 content management personnel, or based on commercial ratings services such as, for example. BILLBOARD VIDEO CHARTS in the case of music videos. It can be understood that any type of indexing scheme may be used to index portion of the content.

At step 66, a playlist, or multiple playlists, is generated for the playback system 34 in the is facility 12, 14 by the central network computer 18 in the central office 16. The playlist can be used to direct the server 34 to play advertisements, music videos, etc. in a particular order and at particular times of day or days of the week. As discussed hereinbelow, user input may be gathered via, for example, the kiosks 44 or the user computers 46, 47 to allow for the playlist to be customized to the preferences of the patrons of the facility 14. For example, patrons of a health club can indicate what kind of music they like to hear and the times of day that they patronize the club. Club personnel can utilize this information, in addition to the impressions of the employees of the club, to provide input to the computer 18. At step 70 the playlist(s) is delivered to the playback system 34 at the facility 12, 14. At step 72, the computer 18 determines whether the content 52 needs updated on the video/audio servers 34 at the facility 12, 14. If the computer 18 determines that the content 52 needs updated, the flow returns to step 60, where content 52 is obtained from the content provider 22.

If the content 52 does not need updated as determined at step 72, the computer 18 determines whether the playlist needs to be updated at step 74. If the playlist does not need updated as determined at step 74, the flow returns to step 72 to determine if the content 52 needs updated. If the playlist needs updated as determined at step 74, the flow returns to step 66 where the computer 66 generates a revised playlist. The playlist can be generated on a periodic basis such as, for example, weekly, and each playlist can cover a period of time such as, for example, one day. The playlist can be transferred to the server 34 in, for example, batch mode, on a specific day and time each week. The flow illustrated in FIG. 3 can be performed either individually or simultaneously for each of the facilities 12, 14.

Figure 4:
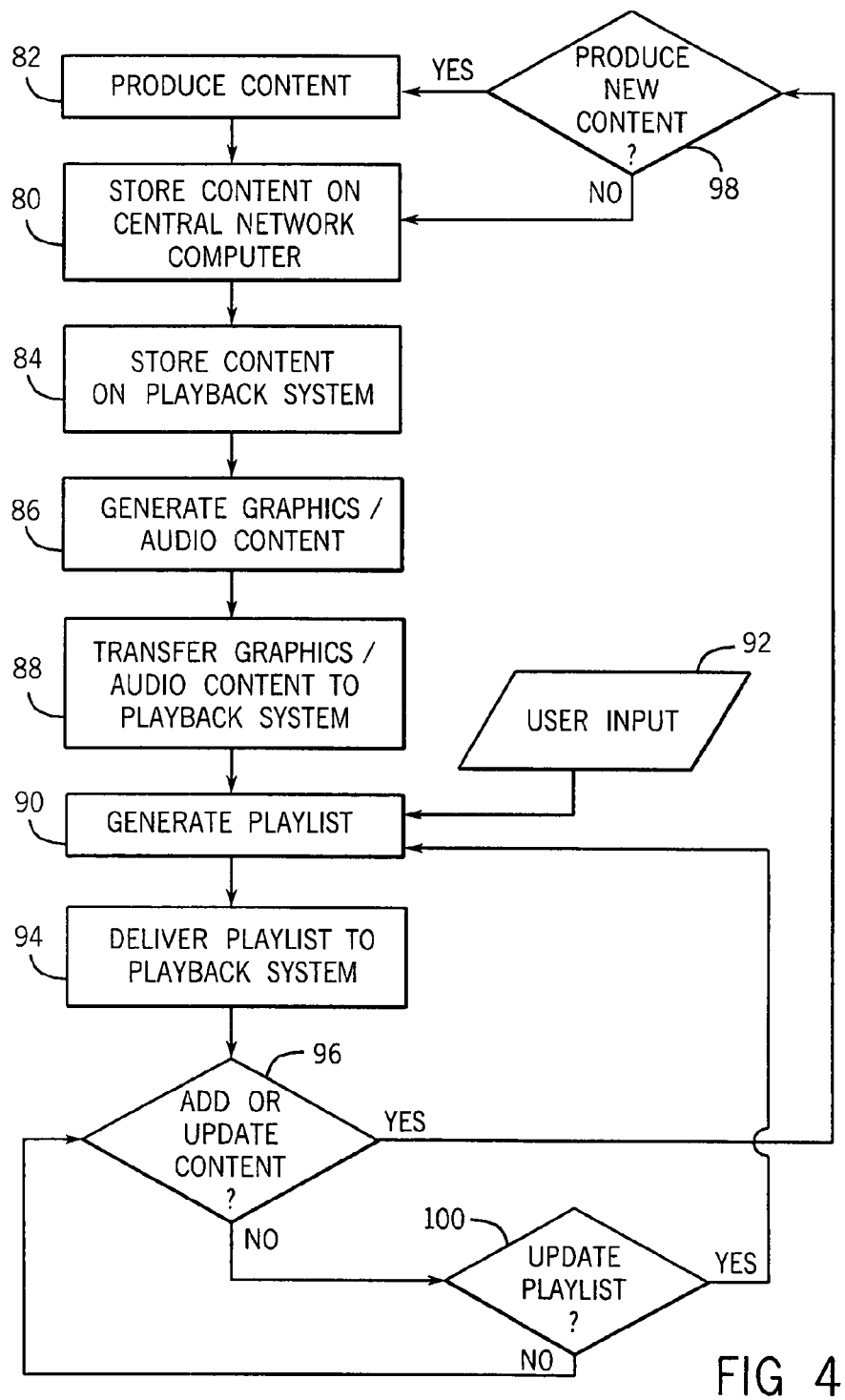
FIG. 4 is a diagram illustrating an embodiment of a flow through the system of FIG. 1 when the system transfers video and audio content which includes customized content to one or more playback systems located at one or more facilities.

FIG. 4 is a diagram illustrating an embodiment of a flow through the system 10 of FIG. 1 when the system 10 transfers video and audio content which includes customized content to one or more video/audio servers 34 located in one or more facilities 12, 14. At step 80, produced audio and video content 82 is stored in the database 20 of the central office 16. The produced content can be, for example, commercials that can be used to advertise, for example, local businesses and professions such as, for example, realtors, doctors and physicians, and attorneys. These advertiser categories can be determined, for example, by surveying facility personnel or by performing a demographic analysis of the facility 12, 14 to which it is desired to place advertisements. The produced content can also be, for example, advertisements for regional and national businesses. At step 84, the content 82 is stored on one or more video/audio servers 34 located in one or more facilities 12, 14 via, for example, the satellite links 28, 36. At step 86, the central network computer 18 is used to generate customized video and/or audio content to accompany the content 82. The content 82 may be screened by, for example, focus or research groups consisting of facility personnel, patrons of the facility 12, 14, or persons not associated with the facility 12, 14.

At step 88, the customized video and/or audio content is stored on the playback system 34 using, for example, the Internet 32. For example, customized graphics can be generated to depict the name and location of a physician's office to accompany a commercial for a physician. Likewise, customized audio may be generated which corresponds to or supplements the customized video. Such an arrangement in which customized audio and video is used in conjunction with the content 82 allows for the content 82 to be syndicated for use at multiple facilities 12, 14 while allowing for information relevant to viewers of the video monitors 42 and listeners of the speakers 40 in each facility 12, 14 to be played only for the benefit of those viewers and listeners. The content 82 may be suited for use by non-affiliated entities. For example, the content 82 may be a commercial for a car dealer that does not depict any particular is model of car. Thus, car dealerships that are not affiliated (i.e. do not sell the same brands of cars) may use the content 82 in conjunction with the customized audio and video. This arrangement also allows for the content 82 to be produced for advertisers that have not yet been identified (i.e. a future advertiser). Also, advertisements may be produced for later broadcast at one of the facilities 14, 16 before the identity of any future advertisers for that facility is known. The customized audio and video content may be designed such that it is compatible with all future content 82 that is produced for a class of, for example, advertisers.

A commercial would thus be included in the content 82 and would be stored on the server 34 in more than one of the facilities 12, 14. One customized graphical tagline in the form of, for example, compressed images such as, for example, GIF, MPEG or JPEG images, and one customized audio file in the form of, for example, a .wav file, could be generated for each of the facilities 12, 14 which will play the advertisement. Such an arrangement allows the same common and professionally-produced commercial to be played in multiple facilities while allowing local advertisers to target (and pay for) viewers in those facilities 12, 14 that are local to the advertisers; for example, the customized content could be a logo or a picture that is specific to a local physician that is added to the end of a "generic" advertisement for physicians. The customized content could also be a voice-over .wav file which is added to the end of the "generic" advertisement.

An indexing system can be used to tag each advertisement with the customized content. For example, a particular common-content advertisement may be designated with a number such as "1". The customized content for advertisement "1" could be designated with a different letter for each version such, as, for example, "A" and "B". Thus, multiple facilities of the facilities 12, 14 would have commercial "1" stored on their video/audio servers 34. However, only one server 34 in one of the facilities 12, 14 would have customized content "A", only one server 34 in one of the facilities 12, 14 would have customized content "B", and so forth. Thus, when various video/audio servers 34 in different facilities 12, 14 execute commercial "1", an integrated commercial "1A" is played at one facility and an integrated commercial "1B" is played at another facility, and each commercial differs from the other because of the customized content. The customized content may be played either simultaneously with the common-content advertisement or the customized content may be played at the conclusion of the common-content advertisement. In either case, no expensive editing of the advertisement need be performed because the common content and the customized content are mixed during playback by the playback system 34. Also, the customized content may be generated such that it may be used with then-existing common content as well as future common content. Thus, for example, a tagline for a local physician should be compatible with all common-content physician advertisements as well as future common-content physician advertisements.

The common content may be, for example, stock footage for which legal rights to broadcast have been secured for, broadcast of the common content at multiple and unidentified facilities 12, 14 in connection with, for example, multiple advertisers.

An advertiser can thus have multiple professionally-produced commercials with customized content (e.g., .gif and .wav files) appended at the end of the commercials or played simultaneously with the common content of the commercials. Because the commercials are used by multiple advertisers (for example multiple non-affiliated advertisers) at multiple facilities 12, 14, the commercials are relatively inexpensive for an advertiser to amass a portfolio of commercials. As described hereinbelow, advertisers may use the computers 46, 47 or the kiosks 44 to view commercials in the portfolio and enter preferences for the types of commercials that should be played from their portfolio at certain times of the day into the computer 18. The computer 18 may then use the preferences to generate a playlist of the commercials for use by the playback system 34.

At step 90, a playlist is generated by the central network computer 18. The playlist can include an order of playing, for example, the content 82, the customized audio and/or video, music videos, etc. The playlist can be generated using input 92 from users of the kiosks 44 or the user computers 46, 48. At step 94, the generated playlist is delivered to the playback system 34 via, for example, the Internet 32. At step 96, the central network computer 18 determines if the content 82 needs updated or additional content needs added to the playback system 34. If the computer 18 determines that content 82 needs to be added or updated, the flow advances to step 98, where the computer determines if new content needs to be produced. If new content needs to be produced, the flow advances to step 82. If no new content needs to be produced but content needs to be updated on the server 34, the flow advances to, step 80, where the updated content is transferred to the server 34.

If the content 82 does not need updating and no new content needs added as determined at step 96, the flow advances to step 100. At step 100, the computer 18 determines if the playlist for the server 34 needs updating. If the playlist needs updating, the flow returns to step 90, where a new playlist is generated. If the playlist does not need updating as determined at step 100, the flow returns to step 96.

Figure 5:
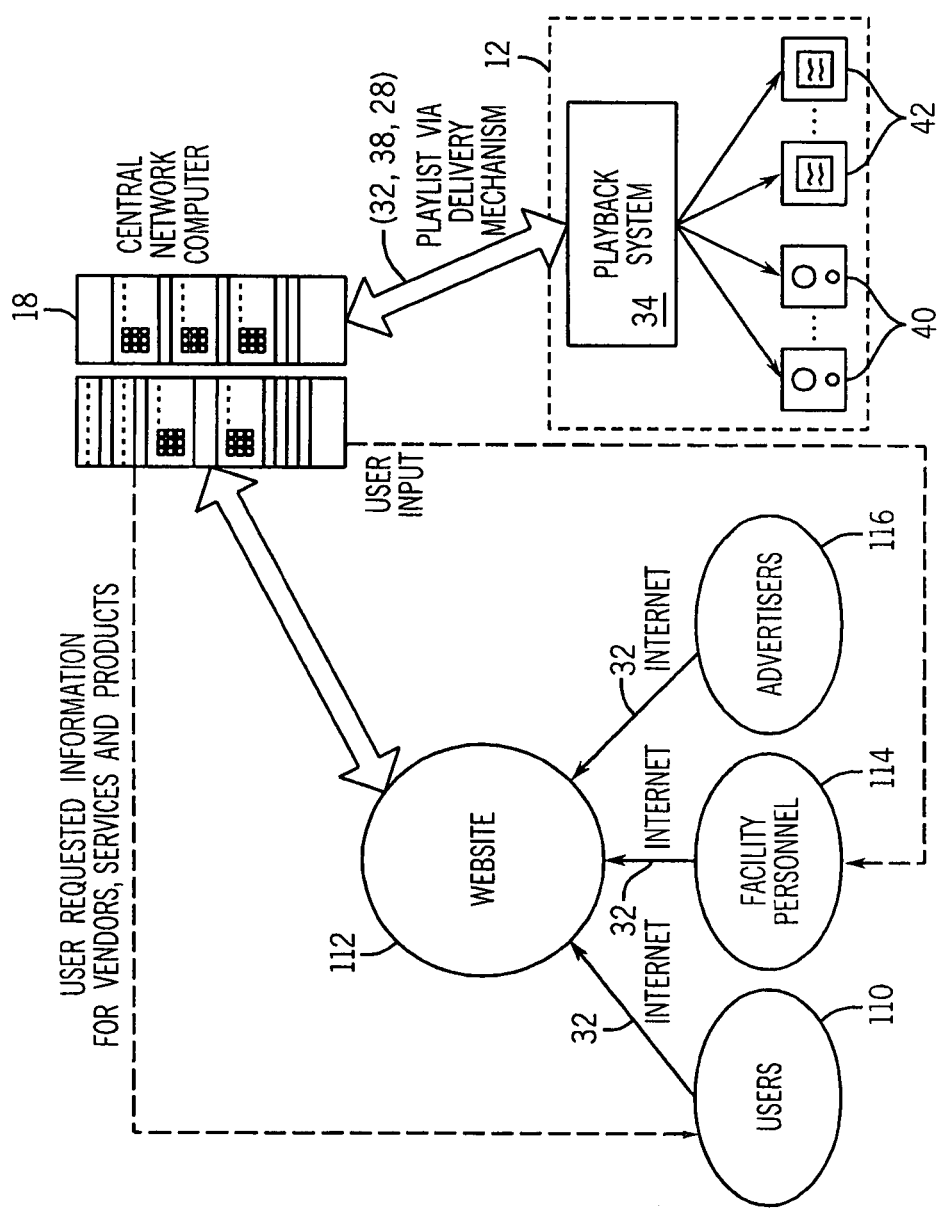
FIG. 5 is a diagram illustrating a typical flow of information through the system of FIG. 1.

FIG. 5 is a diagram illustrating a typical flow of information through the system 10 of FIG. 1. Users 110 may access an Internet website 112, which is resident on the central network computer 18, via the Internet 32 using, the kiosks 44 or the computers 46, 47. The users 110 can be, for example, members or patrons of the facility 12. The users can access information from, for example, vendors, service providers, and retailers via the website 112. The users 110 may also provide input, via the website 112, concerning entertainment preferences. Facility personnel may also access the website 112 via the Internet using the kiosks 44 or the computers 46, 47. The facility personnel 114 may provide input, in the form of surveys, as to the order that content should be played back. The facility personnel 114 may use the user input from the users 110 to provide input regarding the playlist.

Advertisers 116 may access the website 112 via the Internet 32. The advertisers 116 may use the website to view advertisements which have been purchased for broadcast at the facility 12. The advertisers may be given an opportunity to view the advertisements, or portions of the advertisements, in order to approve the content of the advertisements. An arrangement may be set up where advertisements will not be broadcast until the advertiser 116 which purchased the advertisement signifies approval of the content of the advertisement via the website 112. The advertisers 116 may also utilize the website 112 to, for example, become educated on local advertising and branding topics, purchase advertisements, state preferences for times and dates at which certain advertisements will be broadcast to the facility 12, and conduct electronic commerce.

Figure 6:
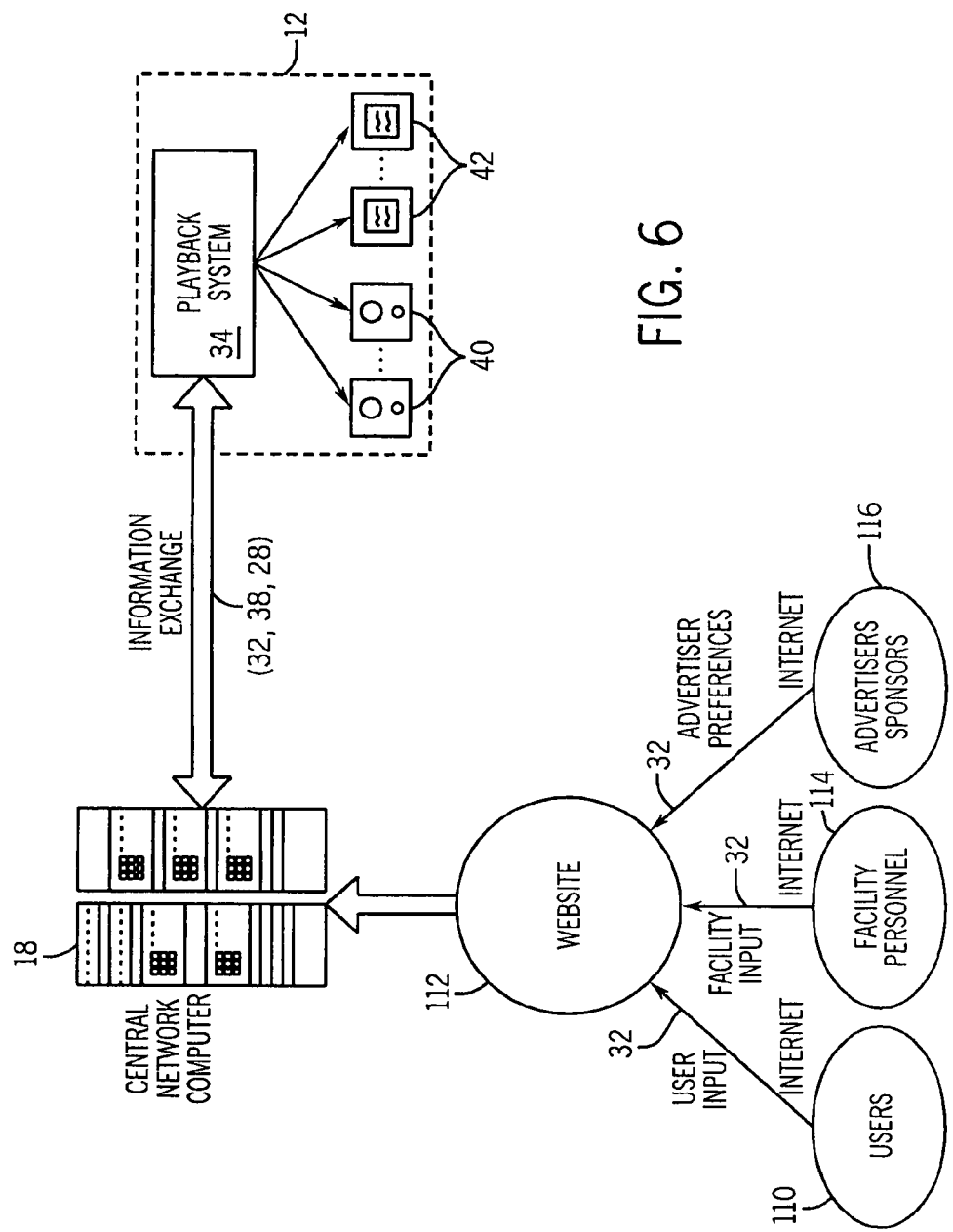
FIG. 6 is a diagram illustrating a typical playlist distribution through the system of FIG. 1.

FIG. 6 is a diagram illustrating a typical playlist distribution through the system 10 of FIG. 1. The users 110, the facility personnel 114, and the advertisers 116 provide input, via the website 112, to the central network computer 18. The central network computer 18 generates the playlist, as described hereinbelow, and transfers the playlist to the playback system 34 via, for example, the Internet 32, the satellite link 38, a direct telephone link, or via swappable hard drives, CDs or DVDs 28.

Figure 7:
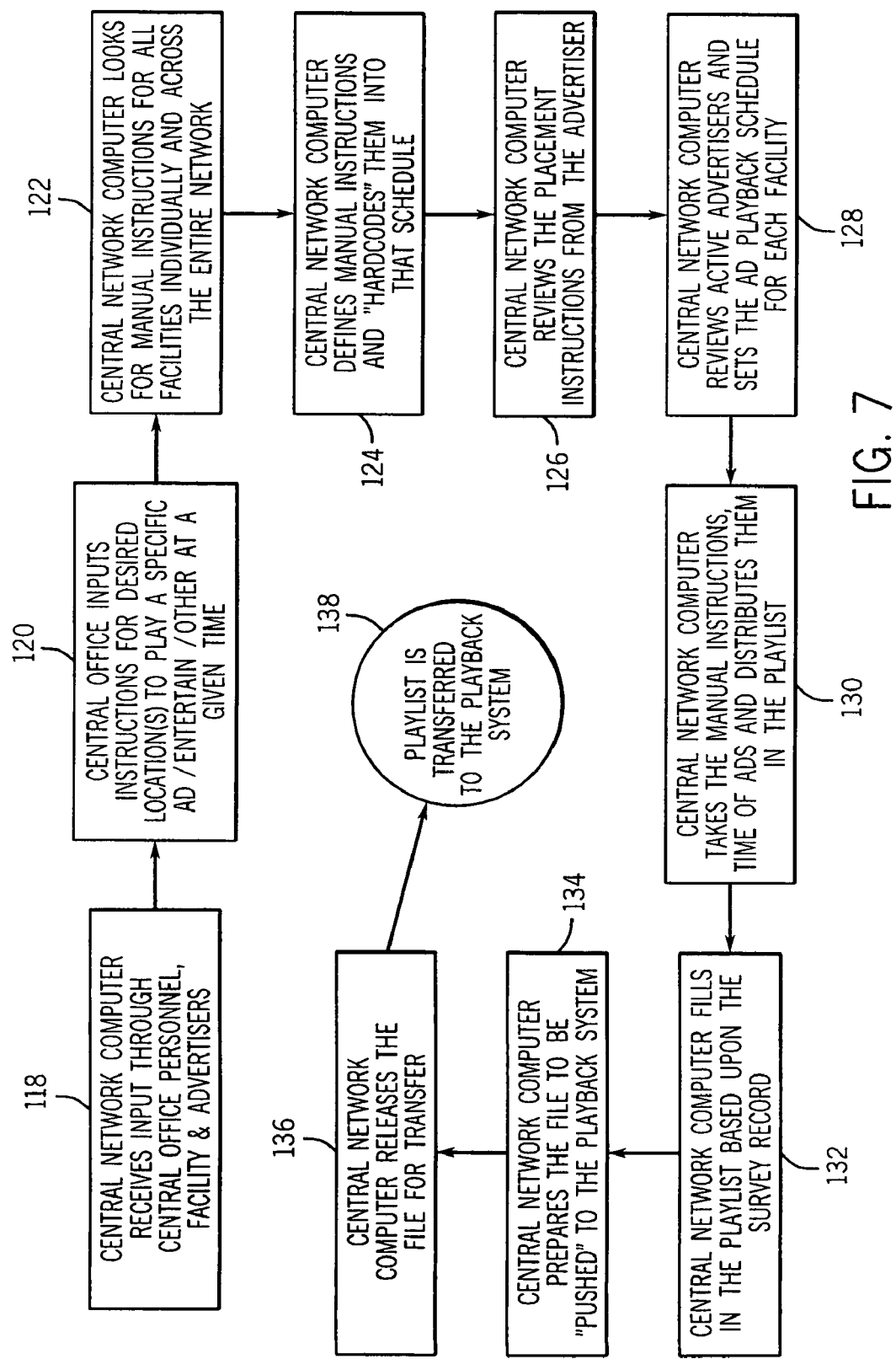
FIG. 7 is a diagram illustrating an embodiment of a flow through the system of FIG. 1 when a playlist is distributed to the playback system of a facility.

FIG. 7 is a diagram illustrating an embodiment of a flow through the system 10 of FIG. 1 when a playlist is distributed to the playback system 34 of the facilities 12, 14. At step 118, the central network computer 18 receives input from central office personnel via, for example, a local area network or the Internet 32, the facility personnel 114, and the advertisers 116 regarding the content of the playlist. At step 120, central office personnel enter instructions regarding the desire of the facility personnel 114 to play a specific advertisement, entertainment content, or other content at a given time.

At step 122, the central network computer 18 looks for manual instructions for all facilities 12, 14 serviced by the central office 16. At step 124, the central network computer 18 defines manual instructions and "hardcodes" (i.e. places them in an inflexible position) in the playlists of each facility 12, 14 for which a playlist is being generated. At step 126, the central network computer 18 reviews the preferences for advertisement placement at a facility 12, 14 as entered by the advertisers 116. At step 128, the central network computer 18 ensures that an advertiser requesting the placement of an advertisement is an active (i.e. a paid-up advertiser) and schedules the advertisements to be entered into the playlist.

At step 130, the central network computer 18 inserts the manual instructions and the time of playback of the advertisements (as determined at step 128) and inserts them into the playlist. At step, 132, the central network computer 18 fills in the playlist with entertainment based on the input received at step 118. At step 134, the central network computer 18 prepares the file containing the playlist to be transferred, or pushed, to the playback system 34 at the facility 12, 14 for which the playlist was developed. At step 136, the central network computer 18 releases the file containing the playlist for transfer to the playback system 34 and, at step 138, the playlist file is transferred to the playback system 34.

Figure 8:
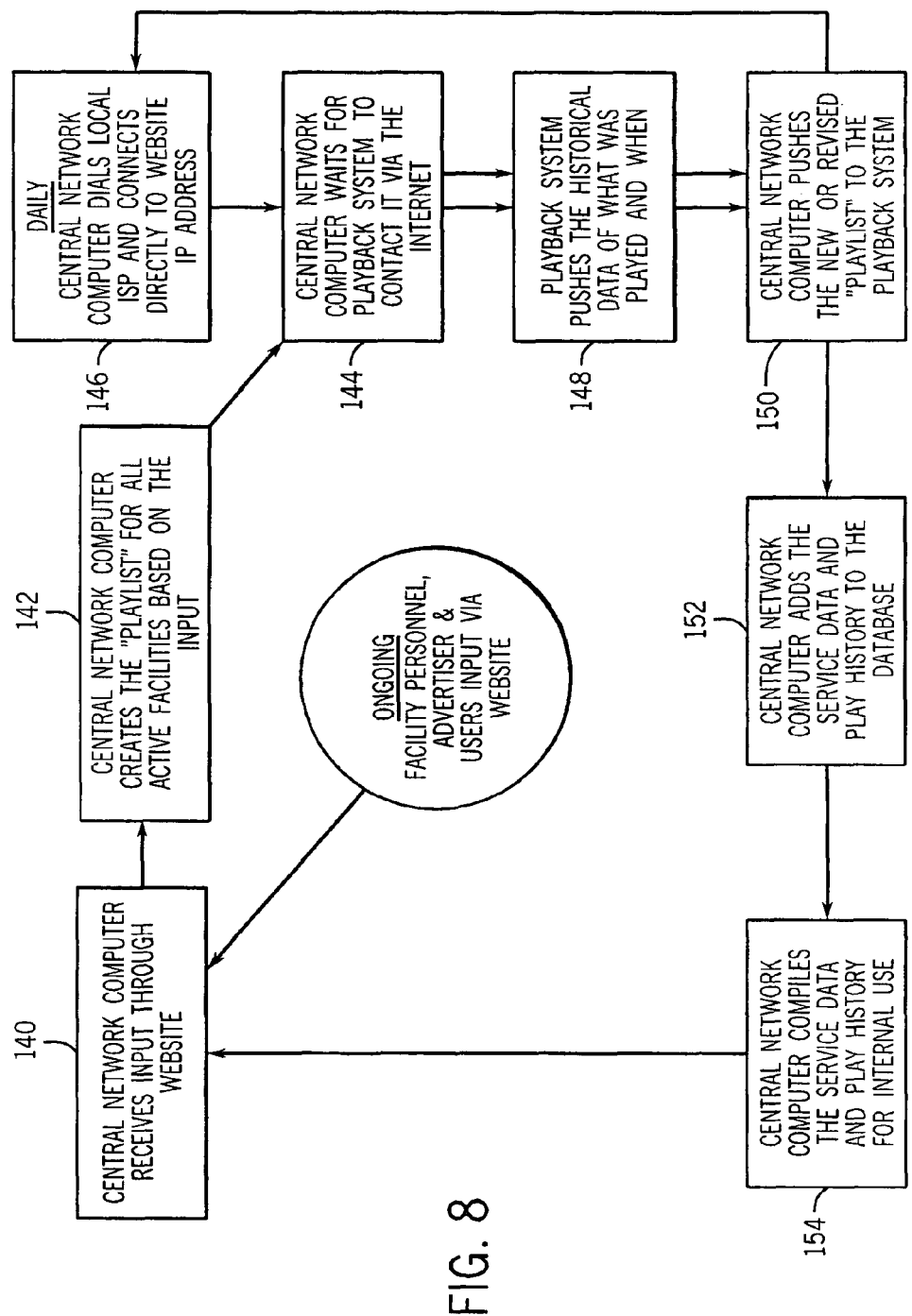
FIG. 8 is a diagram illustrating an embodiment of a flow in which the central network computer communicates with the playback system when generating and transferring a playlist.

FIG. 8 is a diagram illustrating an embodiment of a flow in which the central network computer 18 communicates with the playback system 34 when generating and transferring a playlist. At step 140, the central network computer 18 receives input on an ongoing basis from central office personnel via, for example, a local area network and the users 110, the facility personnel 114, and the advertisers 116 via the website 112. At step 142, the central network computer 18 creates a playlist for all active facilities 12, 14 based on the input received at step 140. At step 144, the central network computer 18 waits for the playback system 34 of each facility 14, 16 to contact it via, for example, the Internet 32. Step 146 illustrates an example of how such a playback system can contact the central network computer 18 on a daily basis. The playback system 34 dials a local Internet service provider (ISP) and connects directly to the Internet protocol (IP) address of the central network computer 18.

At step 148, the playback system 34 transfers, or pushes, historical data as to what content the playback system 34 played and the time it was played since the last time that the playback system 34 connected to the central network computer 18. At step 150, the central network computer 18 transfers, or pushes, a new or revised playlist, which has been generated as described hereinbelow and has been adjusted based on the historical data received at step 148. At step 152, the central network computer 18 adds service data and play history regarding the playback system 34 to a database which is in communication with the computer 18 such as, for example, the database 20. At step 154, the central network computer 18 compiles the service data and the play history data for internal use by central office personnel.

FIGS. 9-11 are diagrams illustrating an example of a portion 156 of a playlist during generation. The portion 156 may be a part of a playlist representing, for example, one hour of programming content for one of the facilities 12, 14. Each place in the portion 156 represents the time at which entertainment or advertisement content will be played back at the facility 12, 14 for which the playlist is being generated. In FIG. 9, a mandated selection "N" is placed in a place in the portion 156. The mandated selection "N" is mandated as to time and the exact file containing the content to be played at that time. FIG. 10 illustrates the next step in playlist generation, in which interstitial files, i.e. files which are randomly distributed within certain guidelines as denoted as "I" are placed in places in the portion 156. Also, advertisements, denoted as "A", are added to slots of the portion 156. To select an advertisement, an advertiser is first selected at random and then a specific advertisement is selected based on the advertiser's preferences. FIG. 11 illustrates the next step in playlist generation in which entertainment, denoted as "H", "M", and "L" are inserted randomly according to tempo. "H" indicates that the entertainment has a fast-tempo (e.g. a rock video), "M" indicates that the entertainment has a medium tempo (e.g. a pop rock video), and "L" indicates that the entertainment has a slow tempo (e.g. a ballad music video). The tempo may be determined based on, for example, an assigned number of 1 through 20, where "1" represents a slow tempo and "20" represents a fast tempo.

FIG. 12 is a diagram illustrating an example of a library 158 from which content is retrieved after the playlist is generated. The library 158 can be stored in, for example, the content database 20 at the central office 16. Each column of the symbolic representation of the library illustrated in FIG. 12 represents a type of content file. The first three columns represent fast, medium, and slow tempo entertainment content. The fourth column represents advertisements and the fifth column represents interstitial content. Each row entry for each column identifies a specific file having a specific portion of entertainment content. For example, the first row in the first column contains a file labeled "HE0001". This file is an entertainment file that is fast tempo and has the label "0001". Thus, when a fast tempo file must be selected for is the playlist, a file with the prefix "HE" (i.e. fast tempo entertainment) is selected from the first column of the library 158 at random, subject to an assigned playback rate as discussed hereinbelow in conjunction with FIG. 13.

Figure 13:
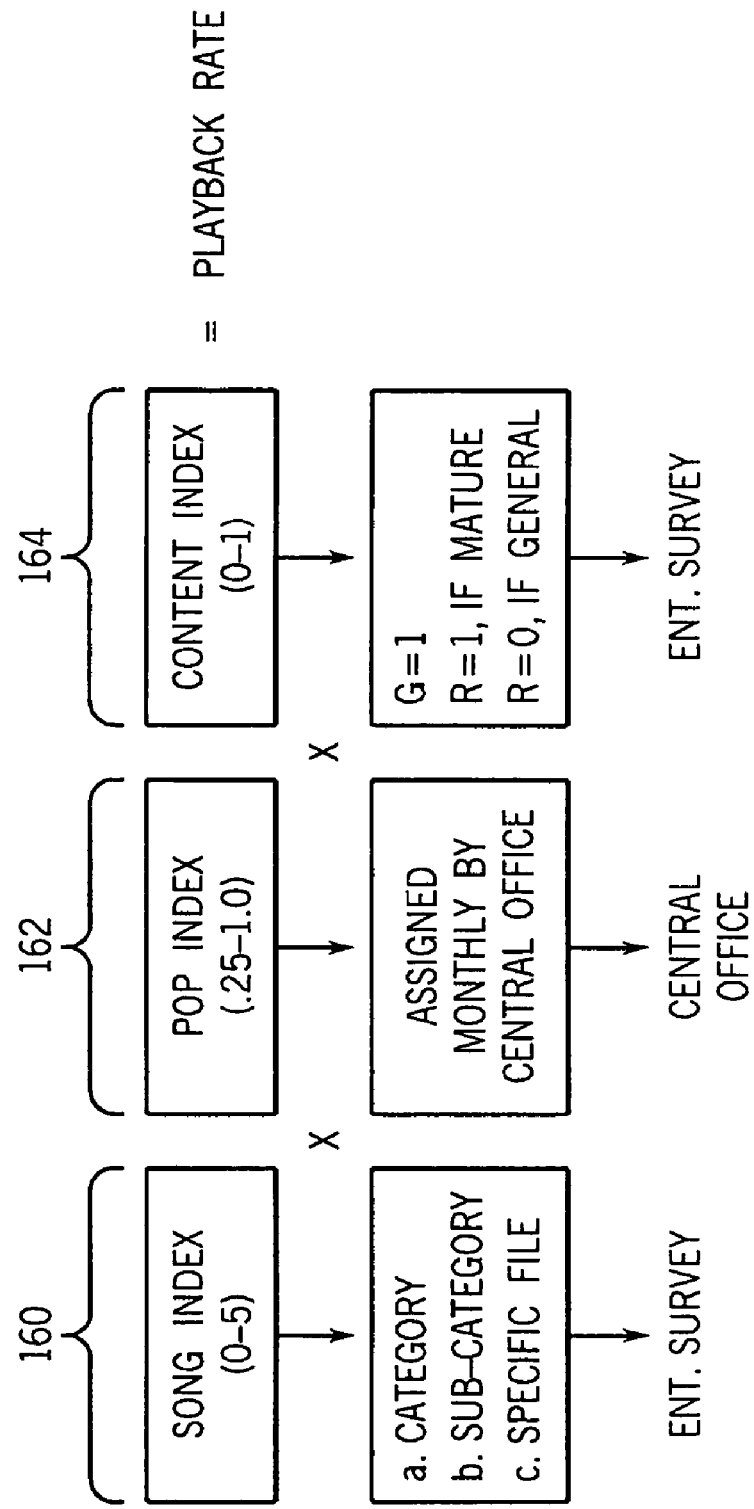
FIG. 13 is a diagram illustrating an example of a process for generating a playback rate of content.

FIG. 13 is a diagram illustrating an example of a process for generating a playback rate of content. The process of FIG. 13 is performed for each file containing entertainment content in the library 158. Initially at step 160, each file is assigned a song index of, for example, 0 through 5 based on surveys completed by personnel of the facility 12, 14 for which the playlist is being generated. The facility personnel rate each category (e.g. pop music), each sub-category (e.g. pop ballads), and specific files (e.g. a specific pop ballad music video) on a scale from 0 to 5. Lower-level ratings supersede higher-level ratings. For example, if facility personnel rate the category of pop music as a 5 but rate a specific pop ballad music video as a 0, the specific pop ballad music video will not be played at the facility. As an example, ratings for each sub-category may take precedence over ratings for each category and ratings for each file may take precedence over ratings for each sub-category and each category. Thus, although personnel of a facility 12, 14 may prefer pop music at a certain time of the day, the personnel may override the playback of specific pop songs by giving the file(s) containing the specific pop songs a low rating.

At step 162, central office personnel assign a popularity index of, for example, 0.25 through 1.0 to each file containing entertainment content in the library 158. Facility personnel can base such popularity indexes on, for example, commercial rating services such as those provided by Billboard, and may be geographic-specific. At step 164, a content index of, for example, a 0 or a 1, is assigned to each file containing entertainment content in the library 158. The index is assigned a "1" if the content is approved for a general audience or if the content is mature and the time slot being considered for playing the content is one in which a mature audience is present at the facility 12, 14 where the content is to be played. The index is assigned a "0" if the content is mature and the time slot being considered for playing the content is one in which a general audience is present at the facility 12, 14. The indexes of steps 160, 162, and 164 are multiplied to arrive at a playback rate.

Figure 14:
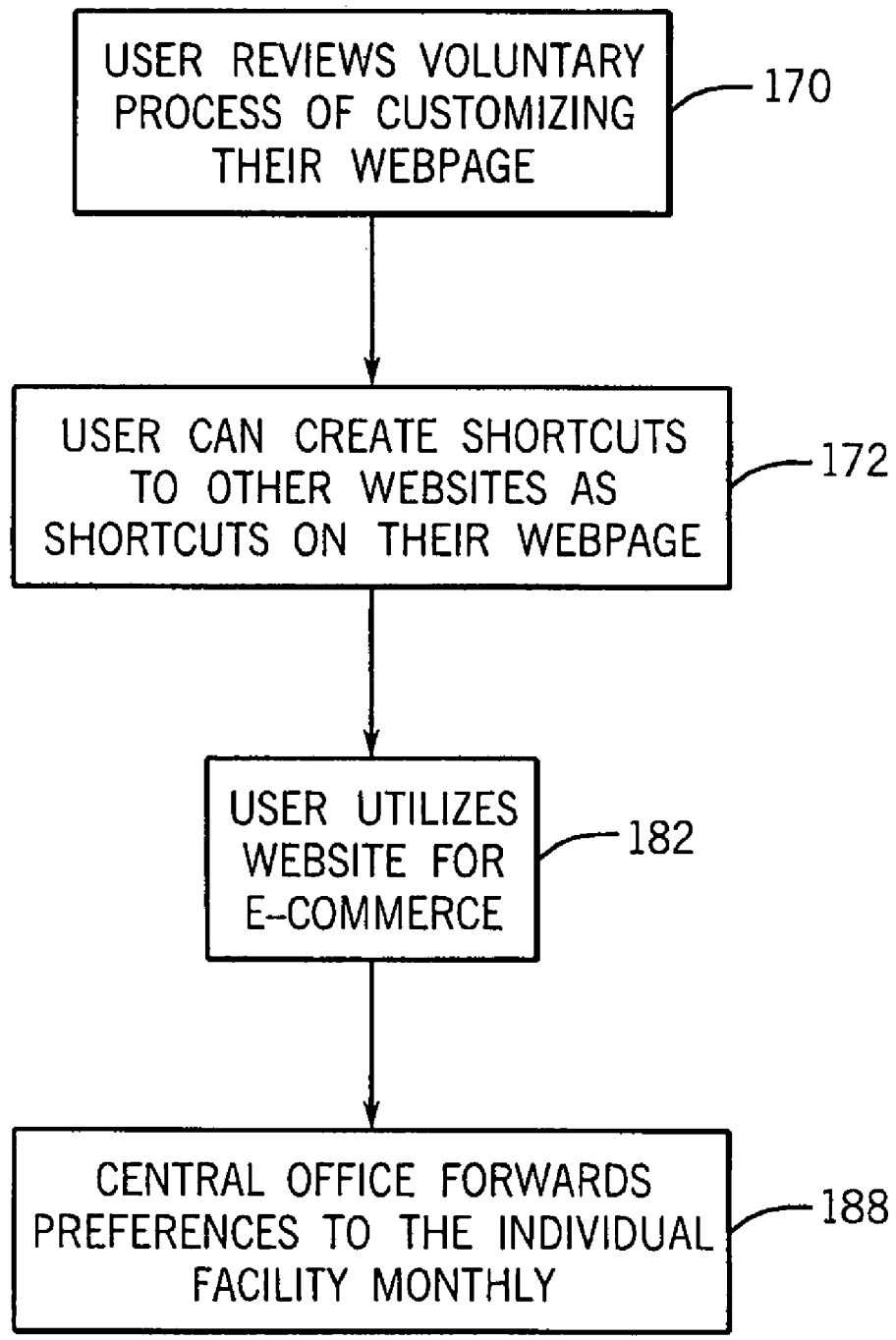
FIG. 14 is a diagram illustrating an embodiment of a process for gathering information from a user of the system of FIG. 1.

FIG. 14 is a diagram illustrating an embodiment of a process for gathering information from a user of the system 10 of FIG. 1. The user may access the website 112 resident on the central network computer 18 via, for example, the kiosks 44 or the computers 46, 47. The user may be, for example, a patron of one of the facilities 12, 14. At step 166, the user accesses the website 112 via the Internet 32. At step 168, the user enters a pre-assigned username and password which allows the user to access their own personal webpage. At step 170, the user reviews a process for customizing their webpage and, at step 172, the user may create links to other websites on their personal website. At step 174, the user completes an electronic form which details preferences, likes, dislikes, etc. of the user in relation to the content that is played at the facility 12, 14 which the user patronizes.

At step 176, the user approves the electronic form and submits the form to the central network computer 18 via the website 112 at step 178. At step 180, the user has completed the web development process and, at step 182, the user may use their personal website to conduct electronic commerce.

For example, the user could purchase CDs or DVDs of music videos that were played at a facility 12, 14 when the user was present at the facility 12, 14.

At step 184, the central office 16 receives the submitted data via the website 112 and makes changes to the user's personal website if necessary. At step 186, the central network computer 18 updates the user's personal website if necessary. At step 188, the central office 16 forwards the user's preferences to personnel of the pertinent facility 12, 14 so that the facility personnel may utilize the preferences to provide input as to the content of future playlists.

Figure 15:
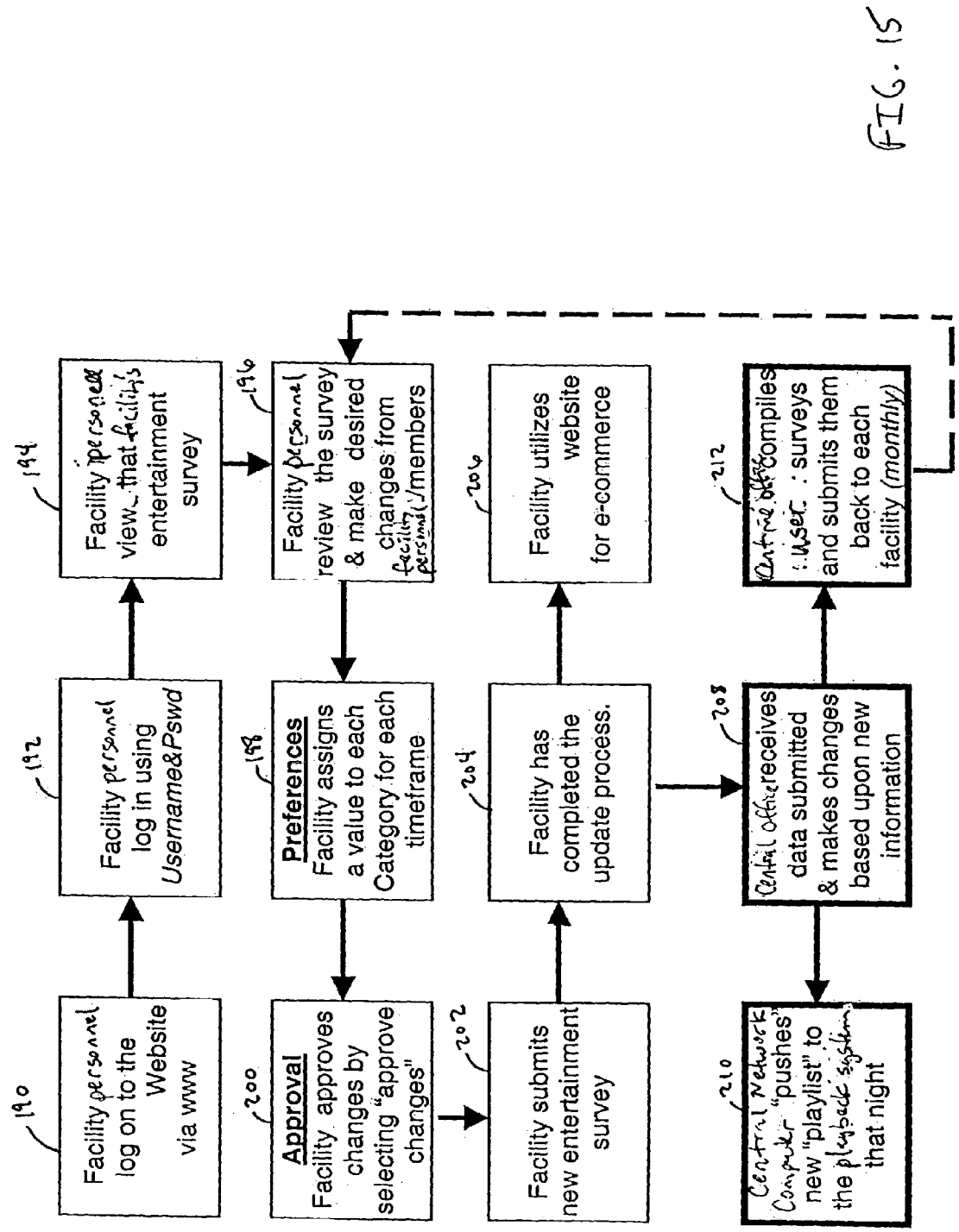
FIG. 15 is a diagram illustrating an embodiment of a process for gathering information from personnel of a facility.

FIG. 15 is a diagram illustrating an embodiment of a process for gathering information from personnel of a facility 12, 14. At step 190, facility personnel select the website 112 using, for example, the kiosks 44 or the computers 46, 47. At step 192, facility personnel log onto the website using a pre-assigned username and password. At step 194, facility personnel view current surveys which list the facility's preferences for specific content categories, sub-categories, and specific files. At step 196, facility personnel review the surveys and make changes as desired by the personnel and based on the entertainment surveys submitted by users as described hereinabove in conjunction with FIG. 14.

At step 198, the facility personnel assign a value to each category, sub-category, and specific file for each timeframe (e.g. morning, afternoon, evening, late night). At step 200, facility personnel approve changes by selecting an option such as, for example, "approve changes" on the website 112. At step 202, the facility personnel submit the newly created entertainment survey to the central office 16. At step 204, the facility personnel have completed the survey updating process and may subsequently access the website 112 at step 206 to conduct electronic commerce.

At step 208, the central office 16 receives, via the website 112, data submitted by the facility and makes changes to any pertinent playlists. At step 210, the central network computer 18 transfers the updated playlist to the playback system 34 in the relevant facility 12, 14. At step 212, the central office personnel compile user surveys monthly and makes them available to facility personnel via the website 112 at step 196. The process of FIG. 15 can also be used to gather information from personnel of a facility 12, 14 regarding prospective entities that may be desirous of advertising in the facility 12, 14. For example, a survey could be presented to the personnel of the facility 12, 14 which lists categories of advertisements (common content) for which advertisements have been produced. The survey would then ask the personnel to identify any patrons of the facility whose business fits into one (or more) of the identified categories and to identify any local establishments whose business fits into one (or more) of the identified categories. In this way, a list of prospective but unidentified advertisers may be generated and the list may be used to sell advertisements in the facility 12, 14 to those entities on the list.

Figure 16:
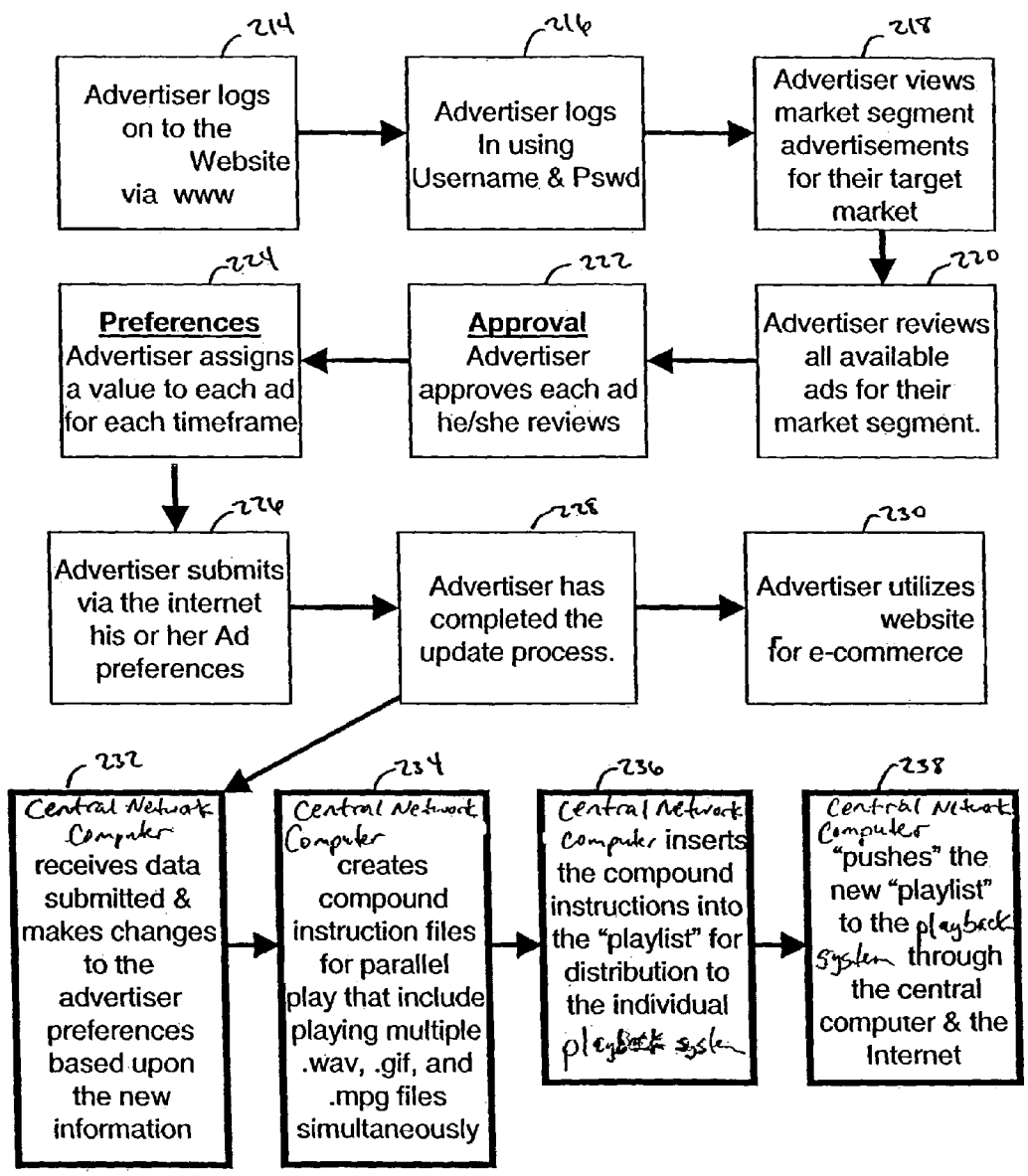
FIG. 16 is a diagram illustrating an embodiment of a process for gathering information to from advertisers.

FIG. 16 is a diagram illustrating an embodiment of a process for gathering information from advertisers. At step 214, an advertiser enters the website 112 via, for example, the kiosks 44 or the computers 46, 47. At step 216, the advertiser logs onto the website 112 using a pre-assigned username and password. At step 218, the advertiser views market segment advertisements for their target market, or advertisement category. For example, a chiropractor would view advertisements for chiropractors. At step 220, the advertiser is given the opportunity to review each of the advertisements in the particular market segment of relevance.

At step 222, the advertiser is given the opportunity to approve each advertisement that the advertiser reviews. At step 224, the advertiser assigns a preference value to each advertisement for each timeframe (e.g. morning, afternoon, evening, late night). For example, an advertisement may contain content which is targeted to a mature audience and thus an advertiser may not want that advertisement played any time except during late night. At step 226, the advertiser submits the advertiser's preferences to the central office 16 via the website 112. At step 228, the advertiser has completed the update process and at step 230, the advertiser may subsequently use the website 112 to conduct electronic commerce.

At step 232, the central network computer 18 receives the data submitted by the advertiser and makes changes to the advertiser's preferences based upon the data. At step 234, the central network computer 18 creates compound instruction files for parallel play that allow multiple .wav sound files, .gif graphics files, and .mpeg video files to play simultaneously. Thus, an advertisement may consist of a general advertisement consisting of an .mpeg file, a voice over customized for a particular advertiser consisting of a .wav file, and a logo consisting of a .gif file. The .wav file and the .gif file may be executed by the playback system 34 simultaneously with the .mpeg file or may be executed by the playback system at the end of the .mpeg file.

At step 236, the central network computer 18 inserts the compound instruction created at step 234 into the playlist for distribution to the facility 12, 14 of interest. At step 238, the central network computer 18 transfers the playlist to the playback system 34 via, for example, the Internet 32.

It can be understood that the system 10 may be used by the facilities 12, 14 to increase business and manage certain functions of the business. For example, a health club could enter demographic information such as, for example, age, gender, lifestyle, occupation, etc. for members and potential members into the computer 18 via the kiosks 44 or the computers 46, 47. Such information could be used by the health club to match against similar information of current members so that the health club could inform the potential member that similarly situated people belong to the health club. The information could also be used to target advertisements and product offerings to members of the club.

Although the present invention has been described herein with regard to certain embodiments, those of ordinary skill in the art will recognize that many modifications and variations of the present invention may be implemented. The foregoing description and the following claims are intended to cover all such modifications and variations.

What is claimed is:

1. A computer-assisted method of preparing video and audio content for playback at a plurality of facilities, comprising:

receiving input at a central network computer from advertisers via a website, the input including advertising content selections and a restrictive rating for each advertising content selection;

processing the input to verify pre-approval of the advertising content selections by the advertisers;

processing the input to identify the presence of the restrictive rating;

transferring the advertising content from the central network computer to at least one remote playback system located in each of the facilities based upon the pre-approval and the restrictive rating of the advertising content selections;

generating, using the central network computer, at least one playlist for each of the facilities, the playlist for determining an order of playback of the advertising content including the advertising content selection based upon the restrictive rating; and transferring each of the playlists from the central network computer to the playback system in each of the facilities.

2. The method of claim 1, wherein transferring the advertising content includes transferring content of at least one advertisement selected from the group consisting of movie advertisements, movie trailers, and music video advertisements.

3. The method of claim 1, wherein generating at least one playlist includes generating at least one playlist based on user preferences.

4. The method of claim 1, wherein generating at least one playlist includes generating at least one playlist based on at least one index associated with each of a portion of the advertising content.

5. The method of claim 1, further comprising storing the advertising content on the central network computer.

6. A method of preparing video and audio content for playback at a plurality of facilities, comprising:

receiving input at a central network computer from advertisers via a website, the input including advertising content selections and a restrictive rating for each advertising content selection;

processing the input to verify pre-approval of the advertising content selections by the advertisers;

processing the input to identify the presence of the restrictive rating;

transferring a first portion of the advertising content from the central network computer to at least one remote playback system located in each of the facilities based upon the pre-approval and the restrictive rating of the advertising content selections;

generating, using the central network computer, a second portion of the advertising content, including the advertising content selections, for each of the facilities, a second portion of the advertising content including customized information; and transferring the second portion of the advertising content from the central network computer to the playback system in each of the facilities based upon the pre-approval and the restrictive rating of the advertising content selections.

7. The method of claim 6, wherein transferring a first portion of the advertising content includes transferring at least one non-specific video advertisement.

8. The method of claim 6, wherein generating a second portion of the advertising content includes generating a specific advertiser identification.

9. The method of claim 6, wherein transferring a first portion of the advertising content includes transferring a first portion of the advertising content using the Internet.

10. The method of claim 6, wherein transferring the second portion of the advertising content includes transferring the second portion of the advertising content using the Internet.

11. A method of transferring video and audio content from a central network computer to at least one playback system at a plurality of facilities, comprising:

receiving input at the central network computer from advertisers via a web site, the input including advertising content selections and a restrictive rating for each advertising content selection;

processing the input to verify pre-approval of the advertising content selections by the advertisers;

processing the input to identify the presence of the restrictive rating;

transferring entertainment content TV playback system in each of the facilities;

transferring advertising content, including the advertising content selections, to the playback system in each of the facilities based upon the pre-approval and the restrictive rating of the advertising content selections;

generating a playlist for the advertising content and the entertainment content for each of the facilities using the central network computer;

generating customized advertising content for each of the facilities using the central network computer;

transferring each of the playlists to the playback system at each of the facilities; and transferring each of the customized advertising content to the playback system at each of the facilities.

12. A system, comprising:

means for receiving input at a central network computer from advertisers via a website, the input including advertising content selections and a restrictive rating for each advertising content selection;

means for processing the input to verify pre-approval of the advertising content selections by the advertisers;

means for processing the input to identify the presence of the restrictive rating;

means for transferring video and audio content from the central network computer to at least one remote playback system located in each of a plurality of facilities based upon the pre-approval and the restrictive rating of the advertising content selections;

means for generating, using the central network computer, at least one playlist for each of the facilities, the playlist for determining an order of playback of the advertising content based upon the restrictive rating; and means for transferring each of the playlists from the central network computer to the playback system in each of the facilities.

13. A system, comprising:

means for receiving input at a central network computer from advertisers via a website, the input including advertising content selections and a restrictive rating for each advertising content selection;

means for processing the input to verify pre-approval of the advertising content selections by the advertisers;

means for processing the input to identify the presence of the restrictive rating;

means for transferring a first portion of video and audio content from the central network computer to at least one remote playback system located in each of a plurality of facilities based upon the pre-approval and the restrictive rating of the advertising content selections;

means for generating, using the central network computer, a second portion of the advertising content for each of the facilities, a second portion of the advertising content including customized information; and means for transferring the second portion of the advertising content from the central network computer to the playback system in each of the facilities.

14. A system, comprising:

a central network computer in communication with a communications medium, the central network computer for generating a plurality of customized video and audio content elements, wherein the central network computer receives advertising content selections from advertisers via a website and processes the advertising content selections to verify pre-approval of the advertising content selections and a restrictive rating for each advertising content selection by the advertisers;

a plurality of playback systems in communication with the communications medium, each of the playback systems having stored thereon video and audio content including at least one of the customized video and audio content elements; and exercise machines, each exercise machine including at least one video monitor in communication with each of the playback systems.

15. The system of claim 14, further comprising a content database in communication with the central network computer.

16. The system of claim 14, further comprising at least one of a kiosk and a computer in communication with each of the playback systems.

17. A computer readable storage medium having stored thereon instructions which, when executed by a processor, cause a processor to perform the steps of:

receiving input at a central network computer from advertisers via a website, the input including advertising content selections and a restrictive rating for each advertising content selection;

processing the input to verify pre-approval of the advertising content selections by the advertisers;

processing the input to identify the presence of the restrictive rating;

transferring a first portion of audio and video content from the central network computer to at least one remote playback system located in each of a plurality of facilities based upon the pre-approval and the restrictive rating of the advertising content selections;

generating, using the central network computer, a second portion of the advertising content for each of the facilities, the second portion of the advertising content including customized information; and transferring the second portion of the advertising content from the central network computer to the playback system in each of the facilities based upon the pre-approval and the restrictive rating of the advertising content selections.

18. A computer readable storage medium having stored thereon instructions which, when executed by a processor, causes a processor to perform the steps of:

receiving input at a central network computer from advertisers via a website, the input including advertising content selections and a restrictive rating for each advertising content selection;

processing the input to verify pre-approval of the advertising content selections by the advertisers;

processing the input to identify the presence of the restrictive rating;

transferring audio and video content from the central network computer to a least one remote playback system located in each of a plurality of facilities based upon the pre-approval and the restrictive rating of the advertising content selections;

generating, using the central network computer, at least one playlist for each of the facilities, the playlist for determining an order of playback of the advertising content; and transferring each of the playlists from the central network computer to the playback system in each of the facilities.

* * * * *